(12) United States Patent
O'Sullivan et al.

(10) Patent No.: US 8,754,910 B2
(45) Date of Patent: Jun. 17, 2014

(54) MOUSE HAVING PAN, ZOOM, AND SCROLL CONTROLS

(75) Inventors: Damien O'Sullivan, County Cork (IE); Denis O'Keeffe, County Cork (IE); Timothy O'Sullivan, County Cork (IE); Yves Karcher, Cully (CH)

(73) Assignee: Logitech Europe S.A., Lausanne (CH)

( * ) Notice: Subject to any disclaimer, the term of this patent is extended or adjusted under 35 U.S.C. 154(b) by 810 days.

(21) Appl. No.: 12/243,866

(22) Filed: Oct. 1, 2008

(65) Prior Publication Data

US 2010/0079500 A1    Apr. 1, 2010

(51) Int. Cl.
*G09G 5/32* (2006.01)
*G06F 3/033* (2013.01)

(52) U.S. Cl.
USPC ............................ 345/660; 345/672

(58) Field of Classification Search
CPC .............................. G06F 3/03543; G06F 3/038
USPC .................... 345/661, 676, 660, 672
See application file for complete search history.

(56) References Cited

U.S. PATENT DOCUMENTS

| | | | | |
|---|---|---|---|---|
| 5,454,043 A | | 9/1995 | Freeman | |
| 5,457,480 A | * | 10/1995 | White | 345/163 |
| 6,061,062 A | * | 5/2000 | Venolia | 715/856 |
| 6,128,006 A | * | 10/2000 | Rosenberg et al. | 345/163 |
| 6,281,881 B1 | | 8/2001 | Siddiqui et al. | |
| D533,554 S | * | 12/2006 | Sheehan et al. | D14/409 |
| 2003/0201977 A1 | * | 10/2003 | Hassig et al. | 345/163 |
| 2006/0017696 A1 | | 1/2006 | Lane | |
| 2007/0046631 A1 | * | 3/2007 | Chang | 345/163 |
| 2007/0109265 A1 | * | 5/2007 | Shih et al. | 345/163 |

FOREIGN PATENT DOCUMENTS

| | | | |
|---|---|---|---|
| DE | 3404047 A1 | | 8/1995 |
| DE | 19648487 C1 | | 6/1998 |
| DE | 19722636 A1 | | 12/1998 |
| JP | 2004-258448 | * | 9/2004 |

OTHER PUBLICATIONS

Andy Cockburn and Joshua Savage, Comparing Speed-Dependent Automatic Zooming with Traditional Scroll, Pan, and Zoom Methods, 2003, In People and Computers XVII: British Computer Society Conference on Human Computer Interaction, pp. 1-16.*
Office Action from China Intellectual Property Office for application CN200910179432.2 (Feb. 5, 2013).
Office Action from China Intellectual Property Office for application CN200910179432.2 (Oct. 26, 2011).
Office Action from China Intellectual Property Office for application CN200910179432.2 (Aug. 1, 2012).
German Patent Office (DPMA) Office Action patent application DE10-2009-043-655.3(Dec. 28, 2011).

* cited by examiner

*Primary Examiner* — Jeffery A Brier
(74) *Attorney, Agent, or Firm* — Kilpatrick Townsend & Stockton LLP

(57) ABSTRACT

A control device includes a processor and a control button. The control button includes a key and an analog sensor coupled to the processor. The key is configured to be moved in a first direction and a second direction, which is substantially opposite from the first direction. The analog sensor is configured to detect an amount of movement of the key in the first direction and the second direction and send a control signal to the processor to indicate the amount of movement. Based on the control signal, the processor is configured to control zoom of a graphical object displayed on a computer monitor at a rate that is based on the amount of movement.

9 Claims, 5 Drawing Sheets

MOUSE HAVING PAN, ZOOM, AND SCROLL CONTROLS

BACKGROUND OF THE INVENTION

The present invention relates generally to a control device for controlling a computer. More particularly the present invention relates to a mouse configured to control a computer and a graphical object displayed on the computer's computer monitor for pan, zoom, and/or scroll of the graphical object.

Control devices, such as mice, are well known for being configured for controlling computers and the like. Mice include devices, such as roller wheels and buttons, for selection of graphical objects and the subsequent scrolling of the graphical objects displayed on a computer's computer monitor. Some mice also include devices for controlling zoom (i.e., magnification and de-magnification) and pan of graphical objects. For example, U.S. Pat. No. 6,281,881 assigned to Microsoft Corporation discusses a mouse that includes a roller wheel for controlling scrolling and zooming and includes other devices for controlling panning.

While various mice are known that include devices for controlling pan, zoom, and scrolling of graphical objects displayed on a computer's computer monitor, the control devices industry continues to strive to create mice including new devices and providing new methods to control these functions.

BRIEF SUMMARY OF THE CLAIMED EMBODIMENTS

The present invention relates generally to a control device for controlling a computer. More particularly the present invention relates to a mouse configured to control a computer and a graphic displayed on the computer's video display for pan, zoom, and/or scroll of the graphic.

According to one embodiment of the present, a control device includes a processor and a control button. The control button includes a key and an analog sensor, which is coupled to the processor. The key is configured to be moved in a first direction and a second direction, which is substantially opposite from the first direction. The analog sensor is configured to detect an amount of movement of the key in the first direction and the second direction and send a control signal to the processor to indicate the amount of movement. Based on the control signal, the processor is configured to control zoom of a graphical object displayed on a computer monitor at a rate that is based on the amount of movement.

According to a specific embodiment, the control device further includes a displacement sensor coupled to the processor. The displacement sensor is configured to detect movement of the displacement sensor relative to a surface. The displacement sensor is associated with a first control function and a second control function of a graphical object displayed on a computer monitor. The control device includes a second sensor coupled to the key and to the processor. The second sensor is configured to detect movement of the key in a third direction and send a second control signal to the processor to signal the movement of the key in the third direction. Based on the second control signal, the processor is configured toggle control of the graphical object from the first control function to the second control function. The first control function is a cursor control function and the second control function is a pan control function.

According to another embodiment of the present invention, a control device includes a processor, and a control button, which includes a key and a sensor configured to detect a key press of the key. The sensor is coupled to the processor and is configured to send a control signal to the processor to signal the key press. The control device includes a roller wheel configured to rotate. Rotation of the roller wheel is associated with a first control function and a second control function of a graphical object displayed on a computer monitor. Based on the control signal, the processor is configured toggle control of the graphical object from the first control function to the second control function.

According to a specific embodiment of the control device, the control device further includes a displacement sensor coupled to the processor and configured to detect movement of the displacement sensor relative to a surface. The displacement sensor is associated with a third control function of a second graphical object displayed on a computer monitor, and with a fourth control function of the first mentioned graphical object displayed on a computer monitor. Based on the control signal, the processor is configured to toggle control of the second graphical object under the third control function to control of the first graphical object under the fourth control function.

According to another specific embodiment of the control device, the key is a flexible key, which is configured to cover the sensor, and a flex of the flexible is configured to activate the sensor. The flexible key is a portion of a surface of the mouse and may be a thumb pad.

According to a specific embodiment, the third control function is a cursor control function of the second graphical object and the fourth control function is a pan control function of the first graphical object. According to another specific embodiment the first control function is a scrolling function of the graphical object and the second control function is a zoom function of the graphical object.

According to another embodiment of the present invention, a control device includes a processor; and a joystick coupled to the processor. The joystick includes a first analog sensor and a second analog sensor. The joystick is configure to move in a first direction and a second direction, which is substantially opposite from the first direction. The joystick is also configured to rotate in a first rotational direction and a second rotational direction, which is substantially opposite the first rotational direction. The first analog sensor is configured to detect an amount of movement of the joystick in the first direction and the second direction and send a first control signal to the processor to indicate the amount of movement. Based on the first control signal, the processor is configured to control panning of a graphical object displayed on a computer monitor. The second analog sensor is configured to detect an amount of rotation of the joystick in the first rotational direction and the second rotational direction and send a second control signal to the processor to indicate the amount of rotation. Based on the second control signal, the processor is configured control zoom of a graphical object displayed on a computer monitor.

According to another embodiment of the present invention, a computer system includes a computer and a computer monitor configured to be controlled by the computer. The computer system also includes a camera configured to communicate with the computer and detect movement of a user hand. The computer is configured to pan a graphical object displayed on the computer monitor based on the detection of movement of the user hand by the camera. The computer is configured to zoom a graphical object displayed on the computer monitor based on a detection of a second movement of the user hand by the camera, and the second movement is in a direction different from a direction of the first mentioned movement.

Other objects, features, advantages, and benefits of the present invention will become apparent upon consideration of the following detailed description and the graphs.

DETAILED DESCRIPTION OF SELECT EMBODIMENTS OF THE INVENTION

The present invention provides a control device. More particularly the present invention provides a mouse having analog and digital devices configured to control pan, zoom, and/or scrolling of a graphical object displayed on a computer's computer monitor.

Figure 1:
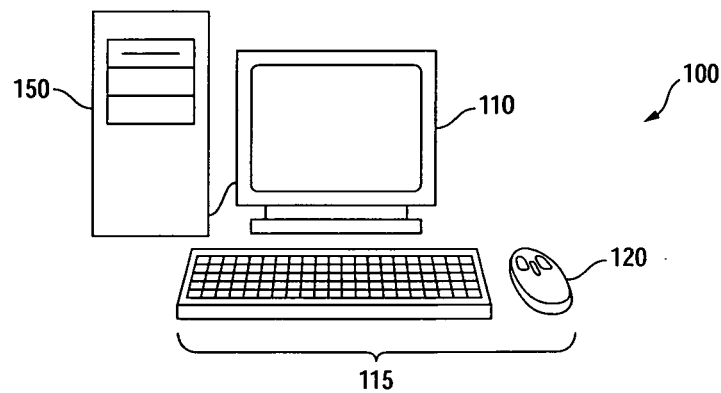
FIG. 1 is a simplified schematic of a computer system according to one embodiment of the present invention.

FIG. 1 is a simplified schematic of a computer system 100 that includes a computer 105, a computer monitor 110, and a set of control devices 115 according to one embodiment of the present invention. The computer may be configured to control the display of one or more graphical objects on the video display, and one or more of the control devices may be configured to manipulate the graphical objects displayed. For example, a mouse 120, included in the set of control devices 115, may be configured to control scrolling, zooming, panning, etc. of at least one graphical objected displayed on the computer monitor.

Figure 2A:
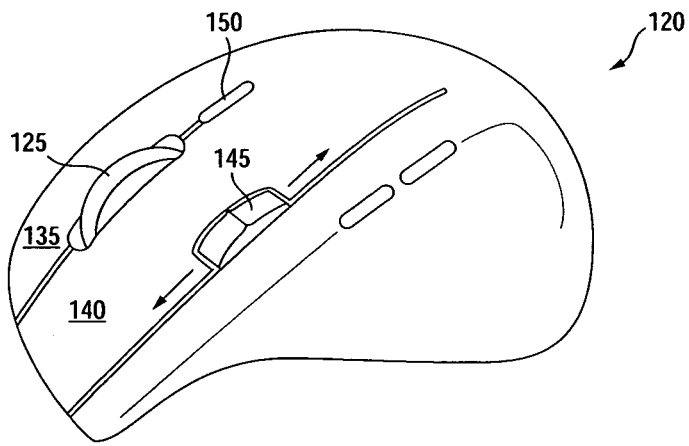
FIGS. 2A and 2B are simplified schematics of mouse 120 according to one embodiment of the present invention.
Figure 2B:
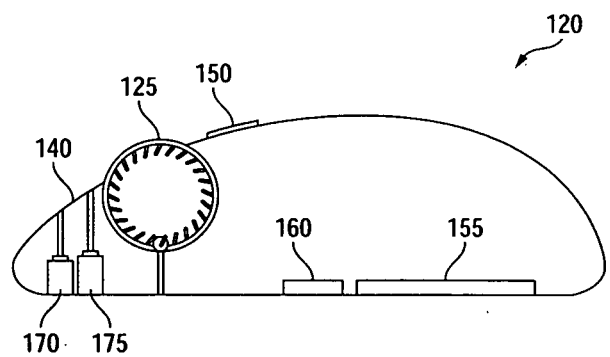

FIGS. 2A and 2B are simplified schematics of mouse 120. FIG. 2A is a perspective view of mouse 120 and FIG. 2B is a cross-sectional view of mouse 120. Mouse 120 may include a roller wheel 125, a roller wheel sensor 130, keys 135 and 140, a first control button 145, a second control button 150, a displacement sensor 155, and a control circuit 160.

Keys 135 and 140 may be respectively associated with sensors 170 and 175 that are configured to detect a key press of their respective keys. The sensors may be digital sensors or analog sensors configured to detect downward movement and/or downward force on the keys. Displacement sensor 155 may be configured to detect movement of the mouse across a work surface, such as a desk top to control the movement of a pointer or the like an the computer monitor. The displacement sensor may be an optical device, a mechanical device, an opto-mechanical device or the like.

Figure 3:
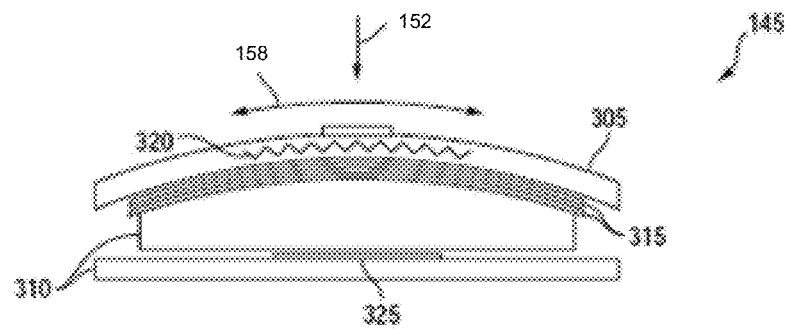
FIG. 3 is a simplified schematic of first control button for a mouse according to one embodiment of the present invention.

FIG. 3 is a simplified schematic of first control button 145. First control button 145 may be configured to slide forward and back (indicated by arrow 158). The first control button may include a key 305, a support 310, and a slide sensor 315, such as an analog sensor, which may be configured to detect forward and back movement of the key. The analog sensor may be a capacitive sensor, a resistance sensor, a magnetic sensor, an electromagnetic sensor, or the like. First control button 145 may be configured to be self centering via a spring device 320 or the like. That is, if key 305 is moved forward or back, the spring device is configured to return the key to a center position. The first control button may also be configured to be pressed downward and activate sensor 325 (indicated by arrow 152), which may be a digital sensor or an analog sensor.

Figure 4:
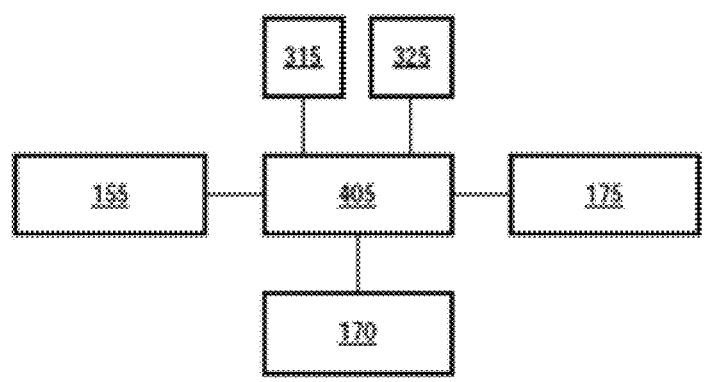
FIG. 4 is a simplified block diagram of a circuit that is included in a mouse according to one embodiment of the present invention.

FIG. 4 is a simplified block diagram of a circuit 400 that is included in mouse 120 according to one embodiment of the present invention. Circuit 400 includes a processor 405, such as a microprocessor, microcontroller, or the like. Each of sensors 170, 175, 315, and 325 may be coupled to processor 405 and may be configured to send signals to the processor. Circuit 400 may include a communication circuit 410, which is coupled to the processor and configured to communicate with computer 105 (see FIG. 1). The communication circuit may be configured to communicate with computer 105 wirelessly or via a wire connection (e.g., a universal serial bus connection).

According to one embodiment of the present invention, first control button 145 and processor 405 are configured to operate to control the zoom of a graphical object displayed on computer monitor 110. Zoom, as is well understood in the art, includes the magnification and demagnification of a graphical object displayed on the computer monitor. For example, if key 305 is moved forward, the graphical object may be enlarged, and if the key is moved back, the graphical object may be reduced. According to one embodiment, sensor 315 is an analog sensor and is configured to send signals to the processor for increasing zoom rates for increasing displacement (forward or back) of key 305. The increase in the rate of zooming may be proportional to the increase displacement of the key.

According to one embodiment of the present invention, a downward press of first control button 145 is configured to change a control characteristic of the mouse. For example, if sensor 325 detects a downward press of key 305 the sensor sends a signal to the processor, which is configured to change the control characteristic of the mouse. According to one embodiment, if the first control button is pressed downward, control circuit 160, which may be configured to change the roller wheel characteristic from a scrolling characteristic to a pan characteristic. That is, if the first control button is pressed, the roller wheel many changed from controlling the vertical scroll of a graphical object to horizontal scroll (i.e., pan) of the graphical object. Alternatively, if the first control button is pressed, displacement sensor 145 may be configured to switch from controlling an on screen pointer to controlling the pan of a graphical object displayed on the computer monitor. If the first control button is pressed downward an additional time, the control characteristic may be changed back to an initial control characteristic. For example, if the first control button is pressed once to change the control characteristic from vertical scrolling to panning, and the first control button is pressed an additional time, the control characteristic of the roller wheel may be change back from panning to vertical scrolling.

Figure 5A:
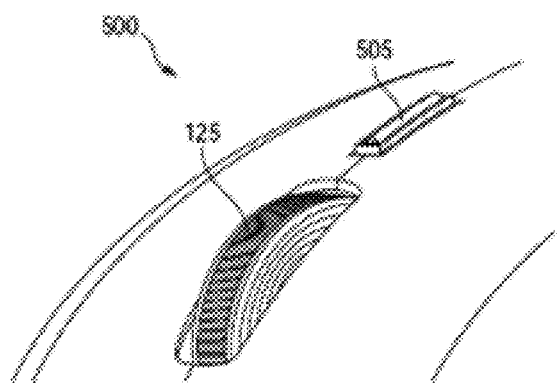
FIG. 5A is a simplified schematic of a portion of a mouse 500 according to another embodiment of the present invention.

FIG. 5A is a simplified schematic of a portion of a mouse 500 according to another embodiment of the present invention. The numeral scheme used in FIGS. 2A and 2B is used to identify elements of mouse 500 that are similar to mouse 120 shown in these figures. Mouse 500 differs from mouse 120 described above in that mouse 500 includes a button 505 that is configured to operate with the mouse's control circuit (such as control circuit 400 described above) to change a control characteristic of the mouse. According to one embodiment, button 505 is configured to be pressed a single time for the control circuit to toggle between control characteristics of the mouse. For example, button 505 may be pressed to change the function of roller 125 from scrolling control to zoom control, and to change the function of displacement senor 155 (see FIG. 2B above) from cursor control to pan control. A subsequent press of button 505 may change the function of the roller back from zoom control to scrolling control and the function of the displacement sensor back from pan control to cursor control. According to one embodiment, roller wheel 125 is the roller wheel described in U.S. patent application Ser. No. 11/317,767, filed Dec. 23, 2006, of Christian Blandin et al., titled "Multi-Function Roller Apparatus and Method for a Control Device", or described in U.S. patent application Ser. No. 11/509,116, filed Aug. 23, 2006, of Christian Blandin et al., titled "Multi-Function Roller Apparatus and Method for a Control Device", both of which are incorporated by reference herein for all purposes.

Figures 5B, 5C:
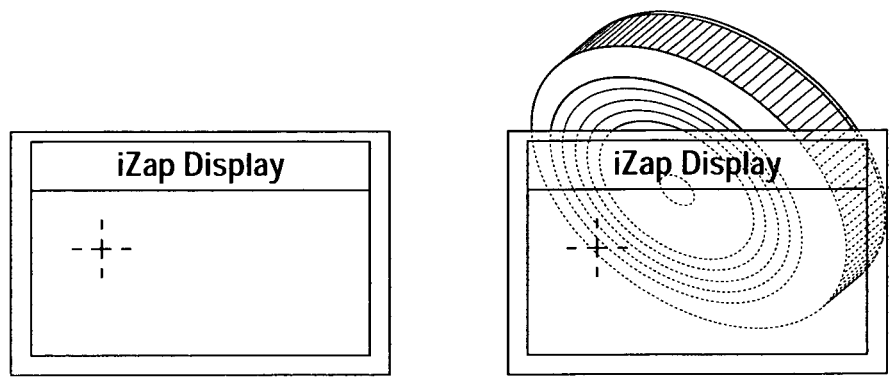
FIGS. 5B and 5C are simplified schematics of icons, which may be displayed on the computer monitor after a mouse button is pressed and the roller wheel is configured for zoom control.

According to one embodiment, if button 505 is pressed and the roller wheel is configured for zoom control, an icon is displayed on the computer monitor to indicate to the user that the roller wheel is configured for zoom control. FIGS. 5B and 5C are simplified schematics of icons 520 and 525, which may be displayed on the computer monitor after button 505 is pressed and the roller wheel is configured for zoom control.

According to one embodiment, a program running on the computer may initiate a change of a control characteristic of the mouse. For example, circuit 400 may provide for two way communication between the mouse and the computer, and if a given program runs on the computer, then a control signal may be sent from the computer to the mouse to change a control characteristic. For example, is a spread sheet program (e.g., Exel™ of Microsoft Corp.) is run on the computer, then the computer may be configured to send a control signal to the mouse to change the function of the roller wheel from cursor control to zoom control, and change the displacement sensor to pan control. According to an alternate embodiment, button 505 may be illuminated by a light source under control of circuit 400. If a program is run on the computer for which the mouse may be used for pan and zoom control, then the computer may be configured to send a signal to the circuit 400 so that circuit 400 may issue a command for the light to be lit to indicate to a user that button 505 may be pressed to change the control characteristic of the roller wheel to zoom control and the displacement center to pan control.

Figure 6:
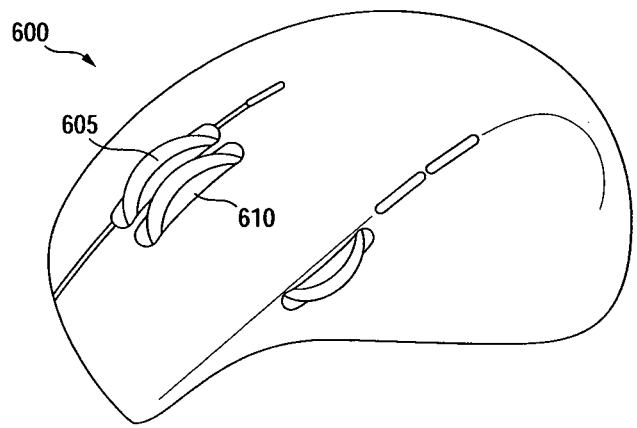
FIG. 6 is a simplified schematic of a mouse according to another embodiment of the present invention.

FIG. 6 is a simplified schematic of a mouse 600 according to another embodiment of the present invention. Mouse 600 includes a first roller wheel 605 and a second roller wheel 610. The first roller wheel may be configured to vertical scrolling. The second roller wheel may be configured to zoom and panning. For example, if the second roller wheel is pressed to activate a sensor, then the processor coupled to the sensor may be configured to change the control characteristic of the second roller wheel. For example, the control characteristic of the roller wheel may be changed from a zoom characteristic to a pan characteristic.

Figure 7:
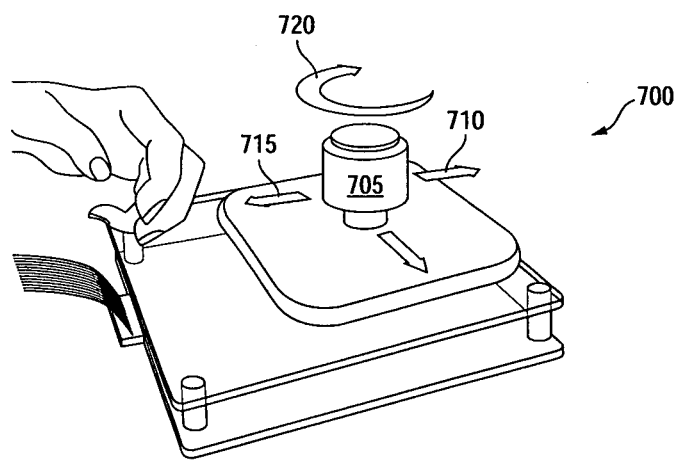
FIG. 7 is a simplified schematic of a control device configured to control zoom, pan, and scrolling of a graphical object displayed on a computer monitor.

FIG. 7 is a simplified schematic of a control device 700 configured to control zoom, pan, and scrolling of a graphical object displayed on the computer monitor. Control device 700 includes a joystick 705 that is configured to be rotated, displaced laterally, and pulled upward According to one embodiment, forward movement (arrow 710) and back movement (arrow 715), which are movements in substantially opposite directions, of the joystick controls pan of a graphical object on the computer monitor. The joystick may include one or more analog sensors configured to detect forward and back movement of the joystick, with large displacements of the joystick effecting relatively faster pan than relatively smaller displacements of the joystick.

The joystick may be configured to be rotated (arrow 720) to the right and left to zoom a graphical object displayed on the computer monitor. For example, the joystick may be configured to be rotated right to enlarge a graphical object displayed on the computer monitor, and the joystick may be configured to be rotated left to shrink a graphical object displayed on the computer monitor. The joystick may include one or more analog sensors configured to detect right and left rotation of the joystick, with larger rotations of the joystick effecting relatively faster zoom than relatively smaller rotations of the joystick.

The analog sensor may include a capacitive sensor, a resistance sensor (such as a force sensing resistor), an electromagnetic sensor, or the like. Control device 700 may include a circuit, such as circuit 400 described above, configured to receive signals from the analog sensors to effect the control functions of the joystick on the computer monitor.

Figure 8:
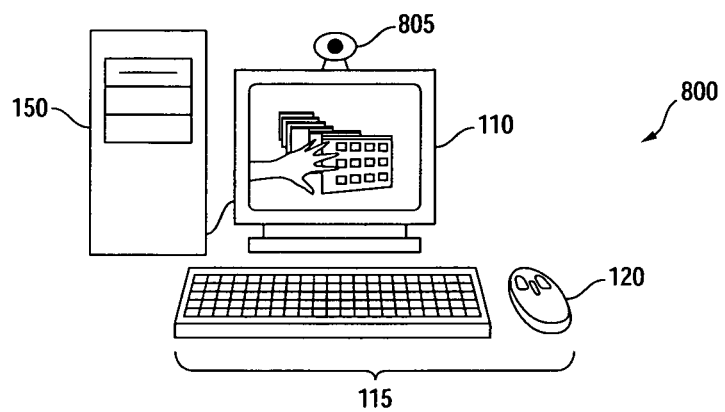
FIG. 8 is a simplified schematic of a computer system according to another embodiment of the present invention.

FIG. 8 is a simplified schematic of computer system 800 according to another embodiment of the present invention. The same numeral scheme used to identify elements in FIG. 1 is used to identify similar elements in FIG. 8. Computer system 800 differs from computer systems described above in that the computer system includes a camera 805 (e.g., a webcam) that is configured to detect a user's hand (e.g., a left hand) movement. Camera 805 operating in combination with software running on computer 105 may be configured to detect movement of a user's hand to control pan, zoom or the like of a graphical object displayed on computer monitor 110. To pan the graphical object, the camera may be configured to detect movement of the user's hand moving left for left panning or right for right panning. To zoom the graphical object, the camera may be configured to detect movement of the user's hand moving up for zoom in (i.e., enlargement) or down for zooming out (i.e., demagnification). According to one embodiment, if the camera detect movement of the user hand in one of the select directions (e.g., left, right, up, down), then the computer may be configured to display a hand in the computer monitor where the hand may be shown to overlay a graphic that is to be controlled. As the user moves their hand left or right, for example, the hand may be shown on the computer monitor as moving with a graphical object that is being panned for example. See the computer monitor as shown in FIG. 8 on which is displayed a user's hand placed on a graphical object, which the computer may pan via detection of the user's hand movement by the camera.

Figure 9A:
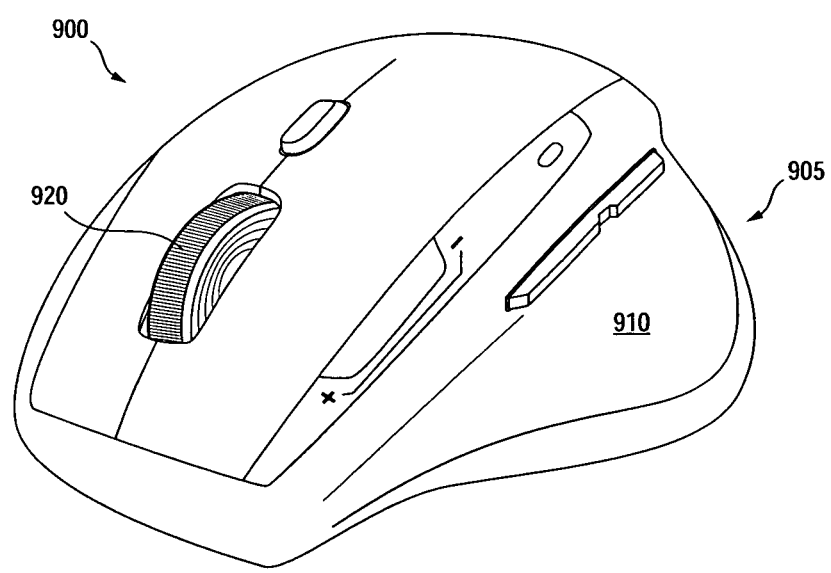
FIGS. 9A and 9B are simplified schematics of a mouse according to another embodiment of the present invention.
Figure 9B:
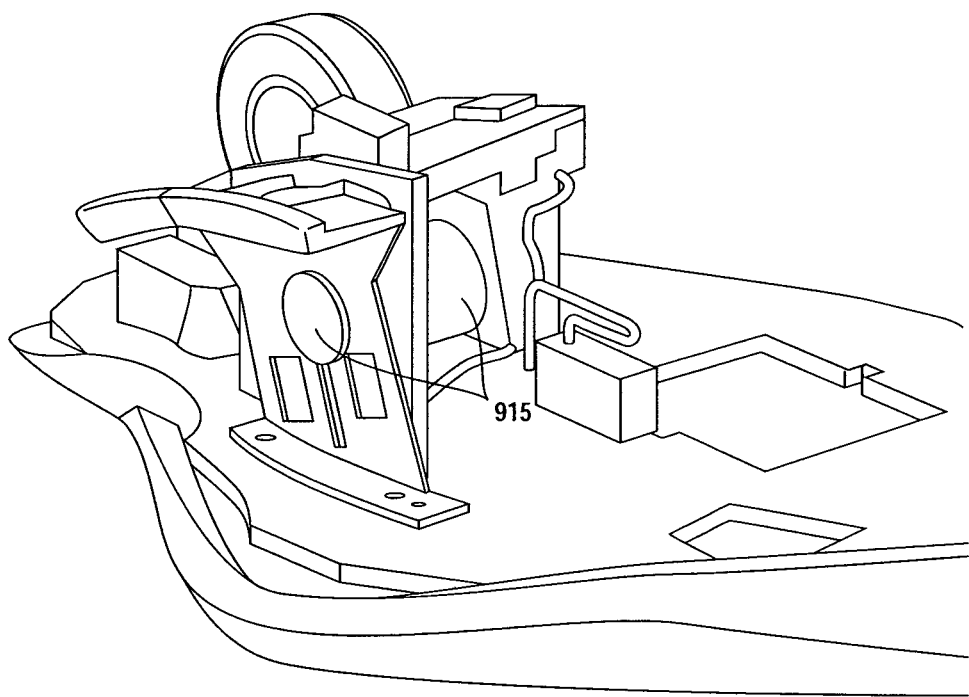

FIGS. 9A and 9B are a simplified schematics of a mouse 900 according to another embodiment of the present invention. FIG. 9A is a overall perspective view of mouse 900 and FIG. 9B is an internal view of the mouse. Mouse 900 includes a button 905. The button includes a flexible key 910 and may be pressed by a user thumb to deflect the flexible key. The flexible key forms a surface of the mouse and has the appearance of a surface of the mouse. According to a specific embodiment, the flexible keys is a thumb pad, which forms a surface of the mouse. The deflected flexible key may activate a switch 915 that is disposed behind flexible key 910. Switch 915 may be an analog switch or a digital, binary switch. Switch 915 may be couple to a processor, such as that shown in FIG. 4 and discussed above. The processor on activation of the switch may be configured to switch the operation mode of various elements of the mouse. For example, a roller wheel 920 of mouse 900 may be configured to toggle between a scroll mode and a zoom mode as discussed above. Also, a displacement sensor (discussed above) may be configured toggle between a cursor control mode and a pan mode. According to one embodiment, the processor is configured to switch operation mode from a first mode to a second mode if switch 915 is pressed and held down, and may be configured to switch the operation mode from the second mode to the first mode if the switch is released.

While the present invention has been described herein with reference to particular embodiments thereof, a latitude of modification, various changes, and substitutions are intended in the present invention. In some instances, features of the invention can be employed without a corresponding use of other features, without departing from the scope of the invention as set forth. Therefore, many modifications may be made to adapt a particular configuration or method disclosed, without departing from the essential scope and spirit of the present invention. It is intended that the invention not be limited to the particular embodiments disclosed, but that the invention will include all embodiments and equivalents falling within the scope of the claims.

What is claimed is:

1. A control device comprising:
    a control circuit;
    a first control button including a sensor operable to detect a button press of the first control button, wherein the sensor is coupled to the control circuit and is configured to send a control signal to the control circuit to signal the button press of the first control button, and wherein depressing the first control button causes the control circuit to toggle two control characteristics of the control device;
    a roller wheel configured to rotate, wherein the rotation of the roller wheel is associated with a first control characteristic of the control device including a first control function and a second control function, and wherein based on the control signal, the control circuit is configured to toggle between the first control function and the second control function; and
    a displacement sensor coupled to the control circuit and configured to detect movement of the displacement sensor relative to a work surface, wherein the displacement sensor is associated with a second control characteristic of the control device including a third control function and a fourth control function, and wherein based on the control signal, the control circuit is configured to toggle between the third control function and the fourth control function.

2. The control device of claim 1 wherein the first control function is a scroll function and the second control function is a zoom function.

3. The control device of claim 1 wherein the third control function is a cursor control function and the fourth control function is a pan function.

4. The control device of claim 1 wherein the first control function is a scroll function, the second control function is a zoom function, the third control function is a cursor control function, and the fourth control function is a pan function.

5. The control device of claim 4, wherein when the second control function is selected, the control circuit is operable to display an icon on a computer display indicating that the zoom function is active.

6. The control device of claim 1, wherein the control circuit is further configured for two-way communication between the control device and a computer, and wherein the control circuit is configured to receive a control signal from the computer to toggle the two control characteristics of the control device.

7. The control device of claim 6, further comprising a light source coupled to and controlled by the control circuit, wherein the light source is operable to illuminate the first control button to indicate to a user that the first control button can be pressed to toggle between the two control characteristics of the control device.

8. The control device of claim 1 further comprising:
    a second control button that includes a key, an analog sensor coupled to the processor, and a spring device, wherein:
        the key is configured to be moved in a first direction and a second direction, which is substantially opposite from the first direction, wherein the spring device is configured to return the key to a center position,
        the analog sensor is configured to detect an amount of movement of the key in the first direction and the second direction from a center position and send a control signal to the processor to indicate the amount of movement; and
        based on the control signal, the processor is configured to control zoom of a graphical object displayed on a computer monitor at a rate that is based on the amount of movement from the center position.

9. The control device of claim 8 wherein the analog sensor is one of a capacitive sensor, a resistance sensor, a magnetic sensor, or an electromagnetic sensor.

* * * * *